United States Patent
Liang (10) Patent No.: US 9,491,097 B2
(45) Date of Patent: Nov. 8, 2016

(54) PACKET FORWARDING IN A STAR STACKING SYSTEM

(71) Applicant: Hangzhou H3C Technologies Co., Ltd., Hangzhou, Zhejiang (CN)

(72) Inventor: Xuewei Liang, Beijing (CN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 56 days.

(21) Appl. No.: 14/394,338

(22) PCT Filed: Oct. 11, 2013

(86) PCT No.: PCT/CN2013/085010
§ 371 (c)(1),
(2) Date: Oct. 14, 2014

(87) PCT Pub. No.: WO2014/059898
PCT Pub. Date: Apr. 24, 2014

(65) Prior Publication Data
US 2015/0146735 A1 May 28, 2015

(30) Foreign Application Priority Data
Oct. 17, 2012 (CN) .......................... 2012 1 0393792

(51) Int. Cl.
| | |
|---|---|
| *H04L 12/721* | (2013.01) |
| *H04L 12/775* | (2013.01) |
| *H04L 12/773* | (2013.01) |
| *H04L 12/931* | (2013.01) |

(52) U.S. Cl.
CPC ............ *H04L 45/72* (2013.01); *H04L 45/583* (2013.01); *H04L 45/60* (2013.01); *H04L 49/00* (2013.01)

(58) Field of Classification Search
CPC ..... H04L 45/72; H04L 45/583; H04L 45/60; H04L 49/00; H04L 49/70
See application file for complete search history.

(56) References Cited

U.S. PATENT DOCUMENTS

| | | | |
|---|---|---|---|
| 2001/0002906 A1 | 6/2001 | Rune | |
| 2007/0008884 A1* | 1/2007 | Tang | ........................ H04L 29/06 370/230 |

(Continued)

FOREIGN PATENT DOCUMENTS

| | | |
|---|---|---|
| CN | 1809022 | 7/2006 |
| CN | 101018180 | 8/2007 |
| CN | 101335716 | 12/2008 |
| CN | 101478496 | 7/2009 |
| CN | 101702678 | 5/2010 |
| EP | 1744489 A1 | 1/2007 |
| EP | 1584150 B1 | 9/2011 |

OTHER PUBLICATIONS

International Search Report and Written Opinion dated Jan. 16, 2014 issued on PCT Patent Application No. PCT/CN2013/085010 dated Oct. 11, 2013, The State Intellectual Property Office.

*Primary Examiner* — Ian N Moore
*Assistant Examiner* — Latresa McCallum
(74) *Attorney, Agent, or Firm* — Hewlett Packard Enterprise Patent Department (57) ABSTRACT

A stacking port extension member receives a packet, forwards the packet according to a destination port number of the packet when a destination forwarding chip identifier (ID) of the packet is a local forwarding chip ID, determine whether the packet is transmitted to a lower-level stacking port extension member when the destination forwarding chip ID of the packet is not the local forwarding chip ID, forward the packet according to a configured forwarding relationship towards the lower-level stacking port extension member when it is determined that the packet is transmitted to the lower-level stacking port extension member, and otherwise, directly forward the packet through a locally configured uplink second-level stacking port.

11 Claims, 7 Drawing Sheets

(56) References Cited

U.S. PATENT DOCUMENTS

| | | |
|---|---|---|
| 2007/0201466 A1 | 8/2007 | Kalkunte et al. |
| 2009/0086620 A1 | 4/2009 | Fowler et al. |
| 2010/0020676 A1 | 1/2010 | Sahul Hameed |
| 2011/0007670 A1* | 1/2011 | Yan ........................ H04L 12/42 370/255 |
| 2012/0020373 A1 | 1/2012 | Subramanian et al. |
| 2015/0195104 A1* | 7/2015 | Okuno .................... H04L 69/08 370/392 |

* cited by examiner

PACKET FORWARDING IN A STAR STACKING SYSTEM

CROSS-REFERENCE TO RELATED APPLICATION

The present application is a 371 application of International Application No. PCT/CN2013/085010 filed on Oct. 11, 2013 and entitled "Packet Forwarding in a Star Stacking System," which claims benefit of Chinese Patent App. No. CN 201210393792.4 filed on Oct. 17, 2012.

BACKGROUND

Stacking refers to combining at least two switch devices to work together to provide as many ports as possible in a limited space. The switch devices supporting stacking are interconnected to form a combined device, which is called a stack. Each of the switch devices forming the stack is called a member. When the members form the stack, these members become one entity whether in management or in use. In other words, the members forming the stack can be managed and used as a single device so that the number of ports and switching capacity can be increased by adding a device. In addition, the reliability of the whole stack is also improved through backup among the members.

BRIEF DESCRIPTION OF THE DRAWINGS

Features of the present disclosure are illustrated by way of example and not limited in the following figure(s), in which like numerals indicate like elements, in which.

DETAILED DESCRIPTION

Hereinafter, the present disclosure will be described in further detail with reference to the accompanying drawings and examples.

In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, and the term "including" means including but not limited to. The term "based on" means based at least in part on. In addition, the terms "a" and "an" are intended to denote at least one of a particular element.

In order to increase access capacity of a stack, a star stacking topology may be used. A stack having a star stacking topology is called a star stacking system.

Figure 1:
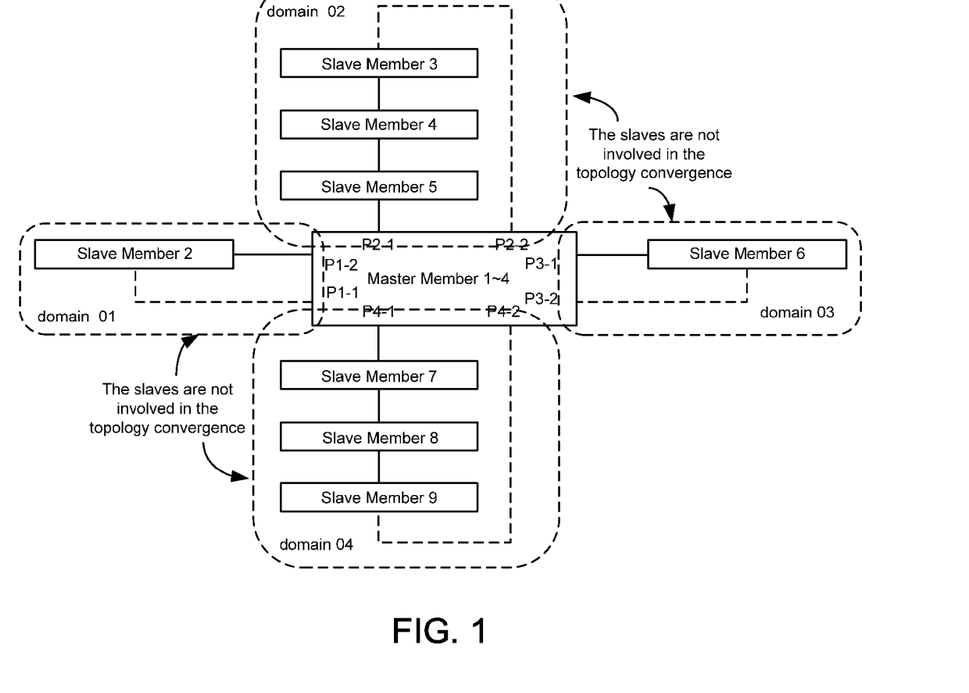
FIG. 1 is a schematic diagram illustrating a structure of a star stacking system.
Figure 2:
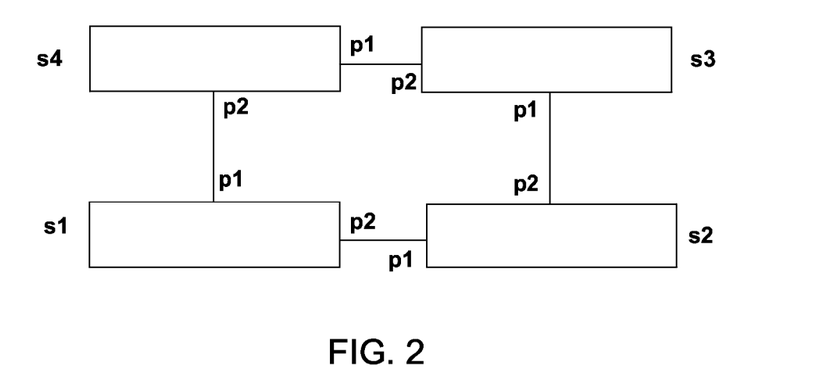
FIG. 2 is a schematic diagram illustrating a primary stacking domain in FIG. 1.

FIG. 1 is a schematic diagram illustrating an example structure of a star stacking system. In FIG. 1, the star stacking system includes a primary stacking domain (referred to as a "Master") and subordinate stacking domains (referred to as a "Slaves"). The Master forms the center of the star stacking system. As shown in FIG. 1, the Master of the star stacking system is formed through a ring stacking or a chain stacking of four devices including master member 1 to member 4. FIG. 2 is a schematic diagram illustrating a ring stacking structure formed by these four devices. In FIG. 2, the stack includes four members, which are denoted as S1, S2, S3 and S4. Each member is configured with two groups of external stacking ports, which are denoted as a first stacking port (P1) and a second stacking port (P2). Two adjacent members are connected such that P1 of one member is connected to P2 of another member. For example, in FIG. 2, P1 of S1 is connected to P2 of S4, and P2 of S1 is connected to P1 of S2, etc., so that a ring stack or a chain stack is formed among the four master members through connections between P1 and P2.

In FIG. 1, the Slaves are divergent star branches, e.g., domain 01, domain 02, domain 03 and domain 04, respectively. The composition of each of domains 01 to 04 is shown in FIG. 1, and includes eight devices of slave member 2 to slave member 9. In a conventional star stacking system, a Master first performs topology convergence. After the Master completes the topology convergence, each of the Slaves performs the topology convergence with the cooperation of the Master. Thus the topology convergence is performed in a hierarchical fashion with the Master first followed by the Slaves and all the members, including both master and slave members are involved in the topology convergence. When all stacking domains including the Master and the Slaves have completed the topology convergence, the star stack is successful formed.

In the above example, the topology convergences is performed hierarchically, which can lead to a very slow convergence process. Besides, as the Master is involved in the topology convergence of each Slave, the burden on its CPUs is increased. Moreover, the impact resulting from a change of the stacking topology is great. In other words, all stacking domains are to repeat the topology convergences when the topology of the Master or the topology of a Slave is changed.

In a method for packet forwarding in a star stacking according to an example of the present disclosure, some of the members in the star stacking system are involved in the topology convergences not all of the member are involved. In this way the speed of topology convergence in the stacking system may be increased. In addition, the members that are involved in the topology convergence do not have to perform the topology convergence hierarchically in the stacking domains, which may solve or alleviate issues caused by hierarchical topology convergence as used in a conventional stacking system.

Hereinafter, the method for packet forwarding in a star stacking system provided by examples of the present disclosure is described in further detail.

In the examples, members in a star stacking system are divided into two groups. Some of the members are used to form a switching and forwarding center of the star stacking system, which is mainly responsible for switching and forwarding, and these members are called "stacking control members" for ease of description. The remaining members are used to extend stacking ports so as to enhance access capacity of the star stacking system. These remaining members may be members other than the stacking control members in the star stacking system, and may be called "stacking port extension members."

Figure 3A:
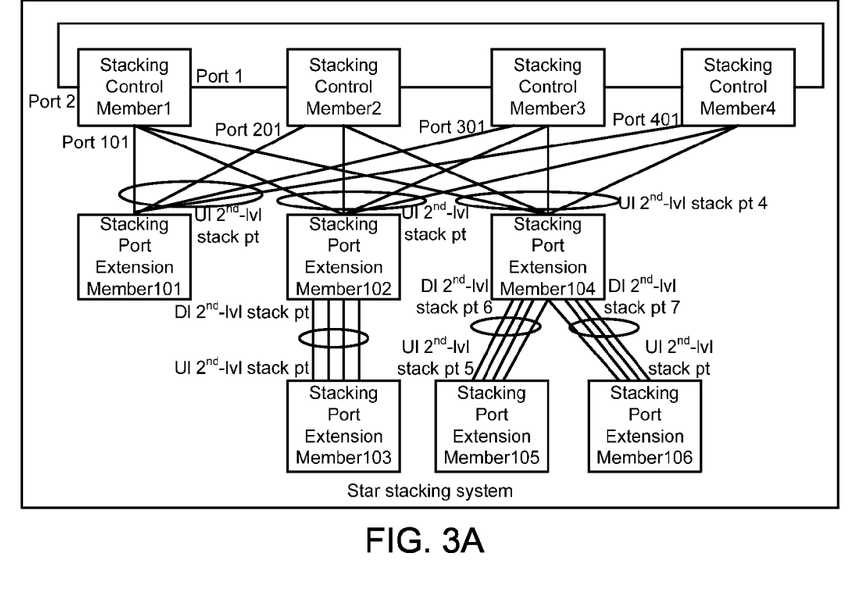
FIGS. 3A and 3B are schematic diagrams illustrating an application networking of packet forwarding in a star stacking system according to an example of the present disclosure.

FIG. 3A is a schematic diagram illustrating packet forwarding in a star stacking system according to an example of the present disclosure. As shown in FIG. 3A, the star stacking system includes Member 1, Member 2, Member 3, Member 4, Member 101, Member 102, Member 103, Member 104, Member 105 and Member 106, which are regarded as members of the star stacking system. Based on the above description, Member 1, Member 2, Member 3 and Member 4 may be selected as stacking control members according to network requirements, and remaining Member 101, Member 102, Member 103, Member 104, Member 105 and Member 106 may serve as stacking port extension members.

Figure 3B:
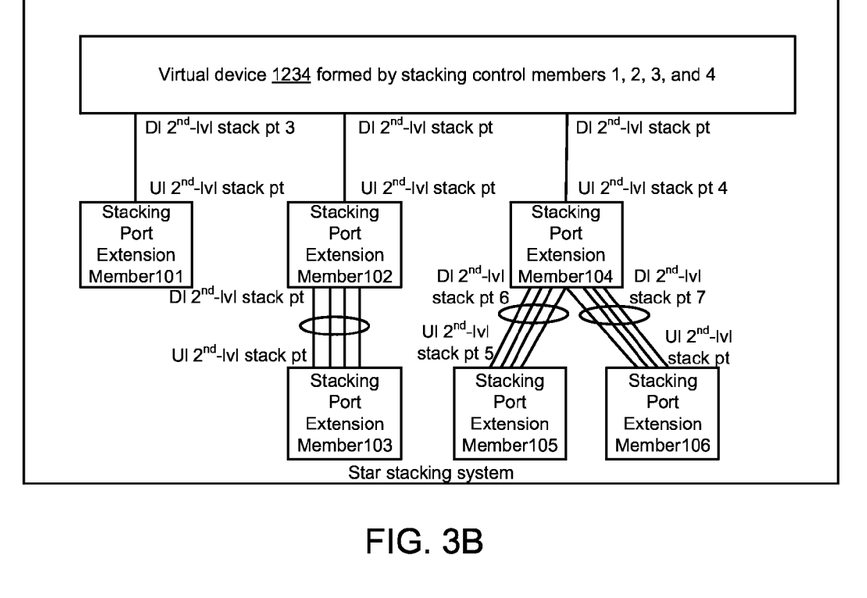

In the star stacking system provided by the example of the present disclosure, the stacking control members may serve as a switching and forwarding center of the star stacking system, which may be in the center of a star topology. The stacking control members may be stacked with each other in the form of a ring stacking or a chain stacking to form one virtual device 1234 (FIG. 3B). In this case, a stacking port between stacking control members is called a "first-level stacking port." E.g., port 1 in FIG. 3A between Stacking Control Members 1 and 2 is a first-level stacking port. A first-level stacking port is a logical port that includes at least one member port (e.g., the first-level stacking port is bound to one or more member ports). The first-level stacking port may comply with the rule that member ports of the same stacking port are provided by the same chip and member ports of different stacking ports are provided by either the same chip or different chips. The stacking port extension members may be used as divergent branches of the star topology. The switching and forwarding center formed by the stacking control members may serve as a root node of a tree structure, and the stacking port extension members are connected to the switching and forwarding center in the form of a tree structure as shown in FIG. 3A.

Stacking Control Member

In examples of the present disclosure, packet forwarding performed by a stacking control member and packet forwarding by a stacking port extension member are processed in different manners, which are described hereinafter.

Hereinafter, packet forwarding by a stacking control member is described.

An example of the present disclosure concerns topological connections between stacking control members. In other words, a stacking control member collects topology information between the stacking control member and other stacking control members that are connected to the stacking control member, and the stacking control member does not collect topology information between the stacking control member and stack port extension members.

The stacking control member may conventionally collect the topology information between the stacking control member and the other stacking control members that are connected to the stacking control member. In examples of the present disclosure, only the stacking control members are involved in the collection of the topological connections, which differs from the conventional stacking technology in which all members are involved in the collection of the topological connections. In addition, source filtering may be used to avoid loops when the topological connections between the stacking control members are collected. This mode avoids loops through detection of a shortest forwarding path, and is not described in detail herein.

Taking the system shown in FIG. 3A as an example, Stacking Control Members 1 to 4 are all involved in the collection of topological connections between each other. For example, Stacking Control Member 1 determines that a first-level stacking port (denoted as port 1) connects Stacking Control Member 1 to Stacking Control Member 2, and another first-level stacking port (denoted as port 2) connects Stacking Control Member 1 to Stacking Control Member 4. Other stacking control members function similarly.

Afterwards, the stacking control members in the star stacking system are configured with stacking port extension members. In this case, one stacking control member may be connected to more than one stacking port extension member, and forwarding relationships are configured for the stacking control members. Here, the forwarding relationships are configured when downlink "second-level stacking ports" that connect the stacking control members to the stacking port extension members are configured. A forwarding relationship includes a device identifier (ID) of a stacking port extension member and a downlink second-level stacking port connected to the stacking port extension member. In this case, the downlink second-level stacking port is a stacking port connected to the stacking port extension member.

Figure 4:
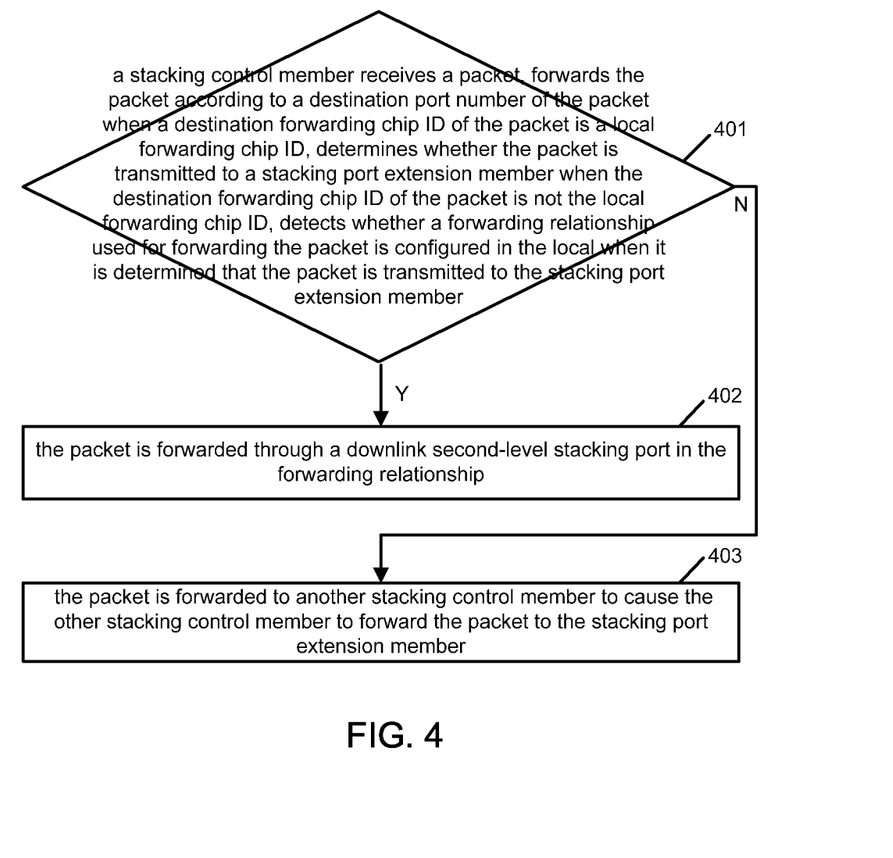
FIG. 4 is a flowchart illustrating packet forwarding performed by a stacking control member according to an example of the present disclosure.

Based on the above description, in the example of the present disclosure, the packet forwarding manner of the stacking control member may be shown in FIG. 4.

FIG. 4 is a flowchart illustrating packet forwarding performed by a stacking control member according to an example of the present disclosure. As shown in FIG. 4, the process may include the following operations.

In block 401, a stacking control member receives a packet. When an ID of a destination forwarding chip of the packet is an ID of a local forwarding chip, the stacking control member forwards the packet according to a destination port number of the packet. When the ID of the destination forwarding chip of the packet is not the ID of the local forwarding chip, the stacking control member determines if the packet is to be transmitted to a stacking port extension member. If the packet is to be transmitted to a stacking port extension member, the stacking control member determines if it is configured locally with a forwarding relationship to forward the packet to a stacking port extension member. If the stacking member determines it is configured locally with a forwarding relationship to forward the packet to a stacking port extension member, block 401 may be followed by block 402. Otherwise block 401 may be followed by block 403.

In block 401, when the ID of the destination forwarding chip of the packet is the ID of the local forwarding chip, the packet is forwarded to a destination of the packet, such as a host, based on the destination port number of the packet.

In addition, in block 401, the stacking control member determines if the packet is to be transmitted to a stacking port extension member by identifying a device ID associated with the destination forwarding chip ID of the packet and determining that the packet is to be transmitted to a stacking port extension member when the device ID belongs to a stacking port extension member. Otherwise the stacking control member determines that the packet is not to be transmitted to a stacking port extension member.

In the example of the present disclosure, a forwarding chip ID is assigned to each member in the star stacking system. Different forwarding chip IDs are assigned to different members. A forwarding chip ID assigned to a member is associated with a device ID of the member. Generally, a member has a unique device ID. Based on this, it may be determined if a packet is to be transmitted to a stacking port extension member by identifying the device ID associated with the destination forwarding chip ID of the packet.

In the example of the present disclosure, when forwarding chip IDs are assigned to members in the star stacking system, forwarding chip ID values may be divided into two groups. A first group of forwarding chip ID values may be used as forwarding chip IDs for stacking control members. A second group of the forwarding chip ID values may be used as forwarding chip IDs for stacking port extension members. Afterwards, different forwarding chip IDs are selected from the first group and assigned to different stacking control members, and different forwarding chip IDs are selected from the second group and assigned to different stacking port extension members.

For example, it is assumed that forwarding chip IDs range from 0 to 127, 0-23 may be selected as a range for forwarding chip IDs of stacking control members, while the remaining 24-127 are used as a range for forwarding chip IDs of stacking port extension members. Taking the network shown in FIG. 3A as an example, 0 to 23 may be a value range of different forwarding chip IDs assigned to Stacking Control Members 1 to 4. For example, when each stacking control member has two forwarding chips, forwarding chip IDs assigned to Stacking Control Member 1 may be 0 and 1; forwarding chip IDs assigned to Stacking Control Member 2 may be 2 and 3, forwarding chip IDs assigned to Stacking Control Member 3 may be 4 and 5, and forwarding chip IDs assigned to Stacking Control Member 4 may be 6 and 7. As to the Stacking Port Extension Members 101 to 106, different values are selected from 24-127 and assigned to Stack Port Extension Members 101 to 106, e.g., forwarding chip IDs assigned to Stack Port Extension Member 101 are 24 and 25, forwarding chip IDs assigned to Stack Port Extension Member 102 are 26 and 27, etc.

In block 402, the packet is forwarded through a forwarding relationship and the process ends.

As described above, in the example of the present disclosure, a forwarding relationship configured in the stacking control member may include the device ID of a stacking port extension member and a downlink second-level stacking port connected to the stacking port extension member. Based on this, in block 402, the packet is forwarded through a forwarding relationship by searching for a downlink second-level stacking port from the forwarding relationships and forwarding the packet through the downlink second-level stacking port in the forwarding relationship.

In block 403, the packet is forwarded to another stacking control member to cause the other stacking control member to forward the packet to a stacking port extension member and the process ends.

As described above, in the example of the present disclosure, the stacking control members collect the topology information between each other. Based on this, in block 403, the packet is forwarded to another stacking control member by selecting a stacking control member that has been configured with the forwarding relationship based on the collected topology information and a shortest path principle, and transmitting the packet to the selected stacking control member through a first-level stacking port to cause the selected stacking control member to transmit the packet through a downlink second-level stacking port specified in the forwarding relationship configured in the selected stacking control member.

It can be seen from the description of block 403 that during the process of packet forwarding, a stacking control member may forward the packet in block 403 even though it does not have a local forwarding relationship used for forwarding the packet. Based on this, in the example, the forwarding relationships may be selectively configured in the stacking control members according to actual networking requirements. Here, the downlink second-level stacking ports are included in the forwarding relationships. Based on this, the downlink second-level stacking ports may be selectively configured on some stacking control members according to the actual networking requirements. For example, downlink second-level stacking ports may be configured on Stacking Control Members 1 and 4 but not on Stacking Control Members 2 and 3.

It should be noted that in the example of the present disclosure, a downlink second-level stacking port that is configured on a stacking control member and connects the stacking control member to a stacking port extension member is a logical port that has at least one member port (e.g., the downlink second-level stacking port is bound to one or more member ports). The member port may be a port that locally connects the stacking control member to the stacking port extension member, or the member port may be a port that remotely connects each of the stacking control members to the stacking port extension member. Examples of the present disclosure are not limited herein.

For example, FIG. 3A shows member ports of a downlink second-level stacking port that connects each of the stacking control members to a stacking port extension member. Assume a downlink second-level stacking port 3 (FIG. 3B) is configured on Stacking Control Member 1 to connect Stacking Control Member 1 to Stacking Port Expansion Member 101, and ports 101, 201, 301, and 304 on Stacking Control Member 1, 2, 3, and 4 respectively connect Stacking Control Members 1 to 4 to Stacking Port Expansion Member 101, then the downlink second-level stacking port 3 (FIG. 3B) configured on Stacking Control Member 1 may be configured to include ports 101, 201, 301 and 401.

Thus, in the above-mentioned block 402 or block 403, the packet is forwarded through the downlink second-level stacking port by selecting a member port from the downlink second-level stacking port, and forwarding the packet through the selected member port.

In this case, a member port may be selected according to a manner for selecting a member port from an aggregation port. For example, Hash arithmetic is performed to characteristic flow parameters of a packet, such as a source MAC address, a destination MAC address, a source port, etc., and the member port corresponding to a Hash result is selected from the downlink second-level stacking port. Examples of the present disclosure are not limited herein.

Stacking Port Extension Member

So far, the description of packet forwarding by the stacking control member is completed.

Hereinafter, packet forwarding manner by a stacking port extension member is described.

In an example of the present disclosure, a stacking port extension member in a star stacking system neither collects topology information nor calculates topology. Thus, in order to ensure that the stacking port extension member can still forward a packet on the premise that the stacking port extension member is not involved in the topology calculation, it is required to perform the following operations to the stacking port extension member in advance.

A first operation is to configure a local uplink second-level stacking port on a stacking port extension member according to networking requirements. Here, the uplink second-level stacking port is a stacking port on the stacking port extension member that connects the stacking port extension member to another member at a higher level in a tree structure, wherein the other member at the higher level may be a stacking control member or a stacking port extension member, which is referred to as a "higher-level stacking port extension member."

Taking the Stacking Port Extension Member 104 in the system shown in FIG. 3A as an example, members at a higher level to which the Stacking Port Extension Member 104 is connected to in the tree structure are Stacking Control Members 1 to 4. That is, an uplink second-level stacking port 4 may be configured on Stacking Port Extension Member 104 to connect Stacking Port Extension Member 104 to Stacking Control Members 1 to 4 in the tree structure.

Taking the Stacking Port Extension Member 105 in the networking shown in FIG. 3A as an example, a member at a higher level to which Stacking Port Extension Member 105 is connected to in the tree structure is Stacking Port Extension Member 104. That is, an uplink second-level stacking port 5 may be configured on Stacking Port Extension Member 105 to connect Stacking Port Extension Member 105 to the Stacking Port Extension Member 104 in the tree structure.

In the example of the present disclosure, the uplink second-level stacking port of the stacking port extension member is a logical port that has at least one member port (the uplink second-level stacking port is bound to one or more member ports), wherein the member port is a port on the stacking port extension member that connects the stacking port extension member to a member at a higher level in the tree structure.

So far, the description of the first operation is completed.

A second operation is to determine, for a stacking port extension member, whether or not to add a member at a lower level for the stacking port extension member based on actual networking requirements (the member at the lower level is a stacking port extension member, and hereinafter is referred to as a "lower-level stacking port extension member"). When it is determined to add a lower-level stacking port extension member, the lower-level stacking port extension member is added to a stacking port extension member based on a tree structure, and a downlink second-level stacking port is configured on the stacking port extension member to connect the stacking port extension member to the added lower-level stacking port extension member based on the added lower-level stacking port extension member. In this case, the objective for adding the lower-level stacking port extension member using the tree structure is to avoid a forwarding loop. Of course, according to the networking requirements, if it is determined that it is not necessary to add a lower-level stacking port extension member to a stacking port extension member, the lower-level stacking port extension member is not added for this stacking port extension member.

When there is more than one lower-level stacking port extension member connected to one stacking port extension member, more than one downlink second-level stacking port may be configured on the stacking port extension member, and each downlink second-level stacking port connects to a different lower-level stacking port extension member. In addition, each downlink second-level stacking port has at least one member port, and different downlink second-level stacking ports have different member ports. Taking the system shown in FIG. 3A as an example, lower-level stacking port extension members configured for Stacking Port Extension Member 104 based on the tree structure are Stacking Port Extension Member 105 and Member 106. In this case, two downlink second-level stacking ports are configured on Member 104, wherein one of the two downlink second-level stacking ports (referred to as port 6) connects to Stacking Port Extension Member 105, and the other downlink second-level stacking port (referred to as port 7) connects to Stacking Port Extension Member 106. It should be noted that in the example of the present disclosure, member ports of each downlink second-level stacking ports 6 and 7 on a stacking port extension member is local. For example, in FIG. 3A, downlink second-level stacking ports 6 and 7 that respectively connect Stacking Port Extension Member 105 and Member 106 are all on Stacking Port Extension Member 104.

So far, the description of the second operation is completed.

A third operation is to configure a forwarding relationship towards the lower-level stacking port extension member. Here, the forwarding relationship is configured when the downlink second-level stacking port connected to the lower-level stacking port extension member is configured. The forwarding relationship includes a device ID of the lower-level stacking port extension member and the downlink second-level stacking port connected to the lower-level stacking port extension member.

Figure 5:
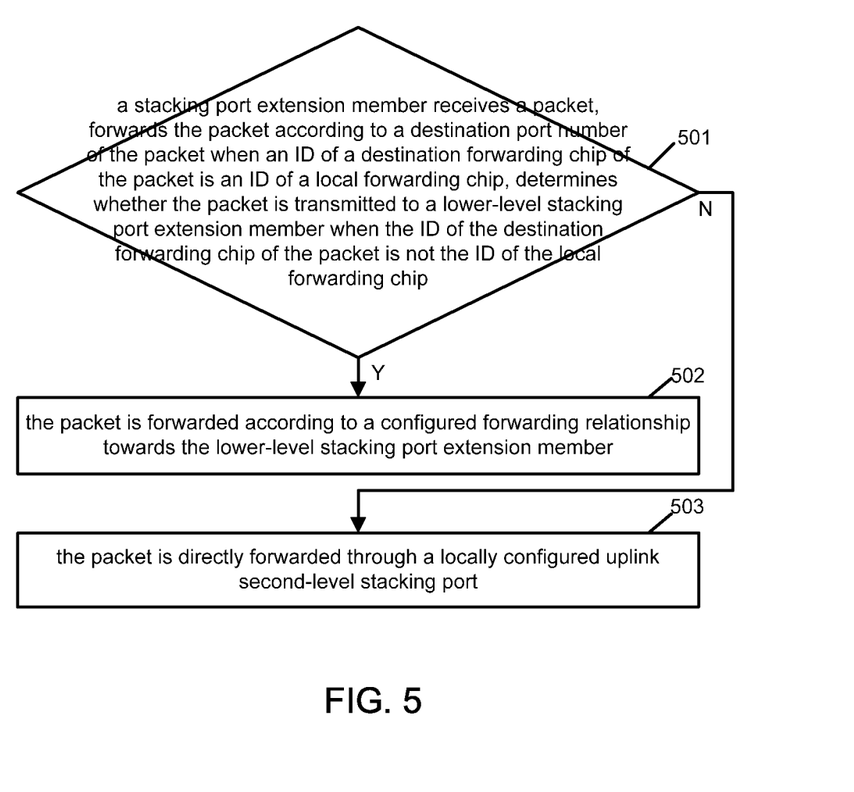
FIG. 5 is a flowchart illustrating packet forwarding performed by a stacking port extension member according to an example of the present disclosure.

Based on the above three operations, the packet forwarding manner of a stacking port extension member may be shown in FIG. 5.

FIG. 5 is a flowchart illustrating packet forwarding performed by a stacking port extension member according to an example of the present disclosure. As shown in FIG. 5, the process may include operations as follows.

In block 501, a stacking port extension member receives a packet and forwards the packet based on a destination port number of the packet when an ID of a destination forwarding chip of the packet is an ID of a local forwarding chip. When the ID of the destination forwarding chip of the packet is not the ID of the local forwarding chip, the stacking port extension member determines whether the packet is to be transmitted to a lower-level stacking port extension member. If so, block 502 is performed. If not, block 503 is performed.

In block 501, the stacking port extension member determines if the packet is transmitted to a lower-level stacking port extension member by: identifying a device ID associated with the destination forwarding chip ID of the packet, determining that the packet is to be transmitted to a lower-level stacking port extension member when the device ID is a device ID of a lower-level stacking port extension member connected to the stacking port extension member, and otherwise determining that the packet is not to be transmitted to a lower-level stacking port extension member.

In this case, a forwarding chip ID is assigned to each member in the star stacking system. Different forwarding chip IDs are assigned to different members. A forwarding chip ID assigned to a member is associated with a device ID of the member. Generally a member has a unique device ID. Based on this, it is easy to determine if the packet is to be transmitted to a lower-level stacking port extension member by identifying the device ID with which the destination forwarding chip ID of the packet is associated. It has been already described in block 401 how to assign each member a forwarding chip ID so the process is not described herein.

In block 502, the packet is forwarded based on a configured forwarding relationship to a lower-level stacking port extension member and the process ends.

As described above, a forwarding relationship towards the lower-level stacking port extension member may include the device ID of the lower-level stacking port extension member and a downlink second-level stacking port connected to the lower-level stacking port extension member. Based on this, in block 502, the packet is forwarded through the configured forwarding relationship towards a lower-level stacking port extension port by: searching for a downlink second-level stacking port from the configured forwarding relationships to the lower-level stacking port extension members, and forwarding the packet through the downlink second-level stacking port.

In block 503, the packet is directly forwarded through a locally configured uplink second-level stacking port and the process ends.

In this case, when the stacking port extension member determines that the packet is not to be transmitted to a lower-level stacking port extension member that is connected to the stacking port extension member, the reason for directly forwarding the packet through a locally configured uplink second-level stacking port are as follows.

The stacking port extension member forwards the packet through a locally configured uplink second-level stacking port or a locally configured downlink second-level stacking port rather than performing topology collection. When it is determined that the destination forwarding chip ID of the packet is not the local forwarding chip ID and the packet could not be transmitted through the downlink second-level stacking port, the stacking port extension member directly forwards the packet through a member port of the uplink second-level stacking port by default. In other words, the packet is directly forwarded to a member at a higher level. When the member at the higher level receives the packet, the member at the higher level processes the packet according to the process shown in FIG. 5 when the member at the higher level is a stacking port extension member, or processes the packet according to the process shown in FIG. 4 when the member at the higher level is a stacking control member, which are not repeated here.

As can be seen from the foregoing description, in the example of the present disclosure, the downlink second-level stacking port on the stacking port extension member has at least one member port. Based on this, forwarding a packet through the downlink second-level stacking port may include selecting a member port from the downlink second-level stacking port, and forwarding the packet through the selected member port.

Similarly, as can be seen from the foregoing description, the uplink second-level stacking port on the stacking port extension member has at least one member port. Based on this, directly forwarding a packet through a locally configured uplink second-level stacking port may include selecting a member port from the locally configured uplink second-level stacking port, and forwarding the packet through the selected member port.

So far, the description of the packet forwarding manner of the stacking port extension member is completed.

Apparatus for Packet Forwarding

The above is the description about the method provided by examples of the present disclosure. Hereinafter, an apparatus provided by examples of the present disclosure is described.

Figure 6A:
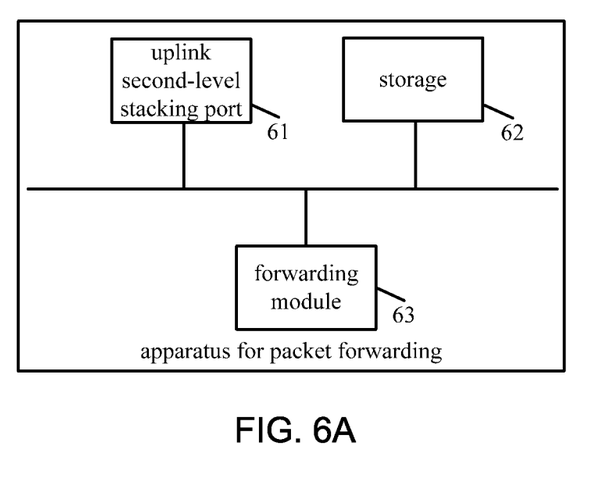
FIG. 6A is a schematic diagram illustrating a structure of an apparatus for packet forwarding according to an example of the present disclosure.

FIG. 6A is a schematic diagram illustrating a structure of an apparatus for packet forwarding according to an example of the present disclosure. The apparatus is applied to a star stacking system, and serves as a stacking port extension member of the star stacking system, wherein the star stacking system also includes stacking control members. Stacking control members are stacked with each other in the form of a ring stacking or a chain stacking to form a switching and forwarding center of the star stacking system. The stacking port extension member is a member other than the stacking control members in the star stacking system. The switching and forwarding center formed by the stacking control members may be served as a root node of a tree structure, and the stacking port extension member is connected to the switching and forwarding center in the form of the tree structure.

As shown in FIG. 6A, the apparatus may include:

an uplink second-level stacking port 61 to connect to a higher-level stacking port extension member or a stacking control member;

a storage 62 to store a forwarding relationship towards a lower-level stacking port extension member;

a forwarding module 63 to receive a packet, forward the packet according to a destination port number of the packet when an ID of a destination forwarding chip of the packet is an ID of a local forwarding chip, determine whether the packet is to be transmitted to a lower-level stacking port extension member when the ID of the destination forwarding chip of the packet is not the ID of the local forwarding chip, forward the packet based on a forwarding relationship to a lower-level stacking port extension member that is stored in the storage 62 when it is determined that the packet is to be transmitted to a lower-level stacking port extension member, and otherwise directly forward the packet through the uplink second-level stacking port.

In the example of the present disclosure, a forwarding chip ID is assigned to each member in the star stacking system. A forwarding chip ID assigned to a member is associated with a device ID of the member. Based on this, the forwarding module 63 determines whether the packet is transmitted to a lower-level stacking port extension member by: identifying a device ID associated with the destination forwarding chip ID of the packet, determining that the packet is to be transmitted to a lower-level stacking port extension member when the device ID is a device ID of a lower-level stacking port extension member, and otherwise determining that the packet is not to be transmitted to a lower-level stacking port extension member.

Figure 6B:
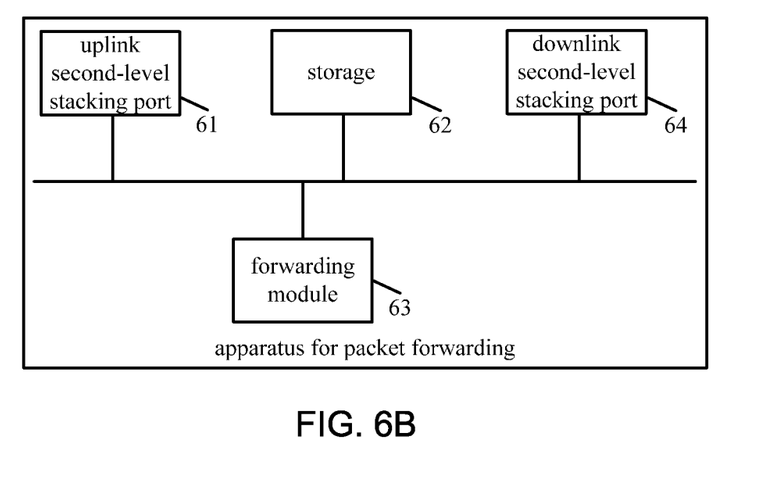
FIG. 6B is a schematic diagram illustrating a structure of another apparatus for packet forwarding according to an example of the present disclosure.

FIG. 6B is a schematic diagram illustrating a structure of the apparatus for packet forwarding according to an example of the present disclosure. As shown in FIG. 6B, the apparatus further includes a downlink second-level stacking port 64 to connect to a lower-level stacking port extension member.

In this case, a forwarding relationship to the lower-level stacking port extension member, which is stored in the storage 62, is configured when the downlink second-level stacking port 64 connected to the lower-level stacking port extension member is configured. The forwarding relationship includes the device ID of the lower-level stacking port extension member and the downlink second-level stacking port 64 connected to the lower-level stacking port extension member. Based on this, when the forwarding module 63 forwards a packet based on the forwarding relationship to the lower-level stacking port extension member, which is stored in the storage 62. The forwarding module 63 is further adapted to search out the downlink second-level stacking port 64 from the forwarding relationships to lower-level stacking port extension members, which are stored in the storage 62, and forward the packet through the downlink second-level stacking port 64.

In the example of the present disclosure, different downlink second-level stacking ports on the stacking port extension member connect to different lower-level stacking port extension members, and have different member ports. Based on this, when the forwarding module 63 forwards the packet through the downlink second-level stacking port 64, the forwarding module 63 is further adapted to select a member port from the downlink second-level stacking port 64, and forward the packet through the selected member port.

In the example of the present disclosure, the uplink second-level stacking port 61 on the stacking port extension member has at least one member port. Based on this, when the forwarding module 63 forwards the packet through the locally configured uplink second-level stacking port 61, the forwarding module 63 is further adapted to select a member port from the locally configured uplink second-level stacking port 61, and forward the packet through the selected member port.

So far, the description of the apparatus shown in FIGS. 6A and 6B is completed.

Figure 7A:
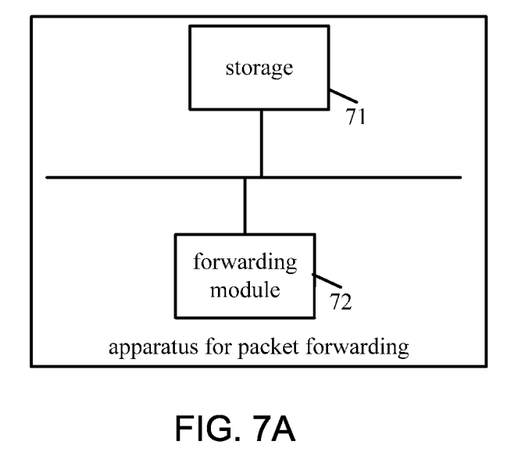
FIG. 7A is a schematic diagram illustrating a structure of another apparatus for packet forwarding according to an example of the present disclosure.

FIG. 7A is a schematic diagram illustrating a structure of another apparatus for packet forwarding according to an example of the present disclosure. The apparatus is served as a stacking control member of a star stacking system. Stacking control members are stacked with each other in the form of ring stacking or chain stacking to form a switching and forwarding center of the star stacking system. The star stacking system also includes stacking port extension members, which are members other than the stacking control members in the star stacking system. The switching and forwarding center formed by the stacking control members may serve as a root node of a tree structure, and the stacking port extension members are connected to the switching and forwarding center in the form of the tree structure.

As shown in FIG. 7A, the apparatus may include:

a storage 71 to store a forwarding relationship;

a forwarding module 72 to receive a packet, forward the packet according to a destination port number of the packet when an ID of a destination forwarding chip of the packet is an ID of a local forwarding chip, determine whether the packet is to be transmitted to a stacking port extension member when the ID of the destination forwarding chip of the packet is not the ID of the local forwarding chip, detect whether the storage 71 has already stored a forwarding relationship used for forwarding the packet when it is determined that the packet is to be transmitted to a stacking port extension member, forward the packet based on the forwarding relationship stored in the storage 71 when it detects that the storage 71 has already stored the forwarding relationship, and forward the packet to another stacking control member when it detects that the storage 71 has not stored the forwarding relationship to cause the other stacking control member to forward the packet to a stacking port extension member.

In the example of the present disclosure, a forwarding chip ID is assigned to each member in the star stacking system. A forwarding chip ID assigned to a member is associated with a device ID of the member. Based on this, when the forwarding module 72 determines if the packet is transmitted to a stacking port extension member, the forwarding module 72 is further adapted to identify a device ID associated with the destination forwarding chip ID of the packet, determine that the packet is to be transmitted to the stacking port extension member when the device ID is a device ID of the stacking port extension member, and otherwise determine that the packet is not to be transmitted to the stacking port extension member.

Figure 7B:
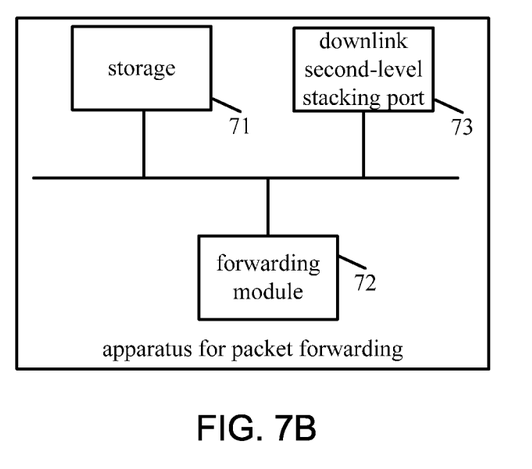
FIG. 7B is a schematic diagram illustrating a structure of another apparatus for packet forwarding according to an example of the present disclosure.

FIG. 7B is a schematic diagram illustrating a structure of the other apparatus for packet forwarding according to an example of the present disclosure. As shown in FIG. 7B, the apparatus may further include a downlink second-level stacking port 73 connected to a stacking port extension member.

In this case, the forwarding relationship stored in the storage 71 is configured when the downlink second-level stacking port 73 connected to the stacking port extension member is configured. The forwarding relationship includes the device ID of the stacking port extension member and the downlink second-level stacking port 73 connected to the stacking port extension member. Based on this, when the forwarding module 72 forwards the packet based on the forwarding relationship stored in the storage 71, the forwarding module 72 is further adapted to search out the downlink second-level stacking port 73 from forwarding relationships stored in the storage 71, and forward the packet through the downlink second-level stacking port 73 in the forwarding relationship stored in the storage 71.

In the example of the present disclosure, the downlink second-level stacking port 73 has at least one member port, wherein the member port may be a local port on the apparatus connected to the stacking port extension member, or may be a port on another stacking control member connected to the stacking port extension member. Based on this, when the forwarding module 72 forwards the packet through the downlink second-level stacking port 73 in the forwarding relationship stored in the storage 71, the forwarding module 72 is further adapted to select a member port from the downlink second-level stacking port 73, and forward the packet through the selected member port.

Figure 7C:
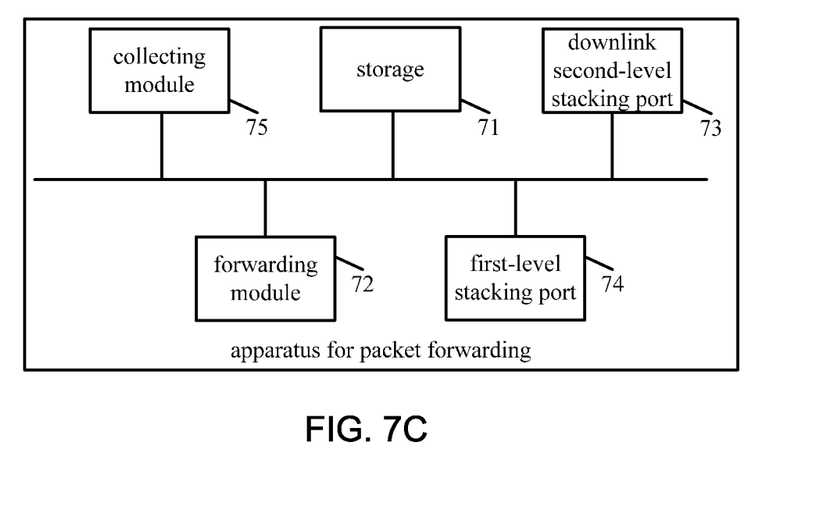
FIG. 7C is a schematic diagram illustrating a structure of another apparatus for packet forwarding according to an example of the present disclosure.

As shown in FIG. 7C, the apparatus may further include a first-level stacking port 74 connected to the other stacking control member, and a collecting module 75, to collect topology information between the apparatus and the other stacking control member that is connected to the apparatus, and not to collect topology information between the apparatus and any stacking port extension member. Based on this, when the forwarding module 72 forwards the packet to the other stacking control member, the forwarding module 72 is further adapted to select a stacking control member which has been already configured with forwarding relationships using the topology information collected by the collecting module 75 based on a shortest path principle, and forward the packet to the selected stacking control member through the first-level stacking port 74.

So far, the description of the apparatus shown in FIGS. 7A, 7B and 7C is completed.

So far, the descriptions of the apparatuses provide by examples of the present disclosure are completed.

As can be seen from the above technical solution, in examples of the present disclosure, the stacking port extension members are not involved in the calculation of stacking topology. Forwarding to a stacking port extension member performed by a stacking control member or another stacking port extension member is generated based on configuration, so that it is ensured that the stacking port extension member becomes effective when the stacking port extension member is powered on, which is completely different form topology convergence in conventional stacking technology. Compared with the conventional stacking technology, in examples of the present disclosure, it is not required to hierarchically perform topology convergence within a plurality of stacking domains, and, a master is not involved in the topology convergence of each slave.

Furthermore, in examples of the present disclosure, the stacking port extension members are not involved in the calculation of stacking topology, so that the impact is not great even though the stacking topology among the stacking port extension members is changed, and only the stacking control members are impacted.

In addition, in examples of the present disclosure, the stacking port extension members support a tree structure so that the port extension capacity is greatly increased, and network flattening is ensured.

The above examples can be implemented by hardware, software or firmware or a combination thereof. For example the various methods, processes and functional units described herein may be implemented by a processor (the term processor is to be interpreted broadly to include a CPU, processing unit, ASIC, logic unit, or programmable gate array etc.). The processes, methods and functional units may all be performed by a single processor or split between several processors; reference in this disclosure or the claims to a 'processor' should thus be interpreted to mean 'one or more processors'. The processes, methods and functional units be implemented as machine readable instructions executable by one or more processors, hardware logic circuitry of the one or more processors or a combination thereof. Further the teachings herein may be implemented in the form of a software product. The computer software product is stored in a non-transitory storage medium and includes a plurality of instructions for making a computer apparatus (which can be a personal computer, a server or a network apparatus such as a router, switch, access point etc.) implement the method recited in the examples of the present disclosure.

The figures are only illustrations of examples, wherein the units or procedure shown in the figures are not necessarily essential for implementing the present disclosure. The units in the aforesaid examples can be combined into one unit or further divided into a plurality of sub-units.

The above are just several examples of the present disclosure, and are not used for limiting the protection scope of the present disclosure. Any modifications, equivalents, improvements, etc., made under the principle of the present disclosure should be included in the protection scope of the present disclosure.

What is claimed is:

1. A method for packet forwarding by a stacking port extension member in a star stacking system, wherein members of the star stacking system comprise at least one stacking control member and at least one stacking port extension member; the method comprising:
   receiving a packet;
   forwarding the packet according to a destination port number of the packet when a destination forwarding chip identifier (ID) of the packet is a local forwarding chip ID;
   determining whether the packet is transmitted to a lower-level stacking port extension member when the destination forwarding chip ID of the packet is not the local forwarding chip ID;
   when a determination is made that the packet is transmitted to the lower-level stacking port extension member, forwarding the packet according to a configured forwarding relationship towards the lower-level stacking port extension member; and otherwise,
   directly forwarding the packet through a locally configured uplink second-level stacking port; wherein the locally configured uplink second-level stacking port connects a higher-level stacking port extension member or a stacking control member,
   wherein:
   the locally configured uplink second-level stacking port on the stacking port extension member has at least one member port;
   the directly forwarding the packet through the locally configured uplink second-level stacking port comprises selecting a member port from the locally configured uplink second-level stacking port, and forwarding the packet through the selected member port.

2. The method of claim 1, wherein:
stacking control members are stacked with each other in the form of a ring stacking or a chain stacking to form a switching and forwarding center of the star stacking system; the switching and forwarding center formed by the stacking control members is served as a root node of a tree structure, and the at least one stacking port extension member is connected to the switching and forwarding center in the form of the tree structure;
a forwarding chip ID is assigned to each of the members in the star stacking system, and the forwarding chip ID assigned to each of the members is associated with a device ID of each of the members;
the determining whether the packet is transmitted to a lower-level stacking port extension member comprises:
   identifying a device ID associated with the destination forwarding chip ID of the packet, determining that the packet is transmitted to the lower-level stacking port extension member when the device ID is a device ID of the lower-level stacking port extension member connected to the stacking port extension member, and otherwise, determining that the packet is not transmitted to the lower-level stacking port extension member.

3. The method of claim 1, wherein:
the forwarding relationship towards the lower-level stacking port extension member is configured when a downlink second-level stacking port connecting the lower-level stacking port extension member is configured, and comprises a device ID of the lower-level stacking port extension member and the downlink second-level stacking port connecting the lower-level stacking port extension member;
the forwarding the packet according to a configured forwarding relationship towards the lower-level stacking port extension member comprises:
   searching out the downlink second-level stacking port from the configured forwarding relationship towards the lower-level stacking port extension member; and
   forwarding the packet through the downlink second-level stacking port.

4. The method of claim 3, wherein
different downlink second-level stacking ports on the stacking port extension member connect different lower-level stacking port extension members, and have different member ports;
the forwarding the packet through the downlink second-level stacking port comprises:

selecting a member port from the downlink second-level stacking port, and forwarding the packet through the selected member port.

5. A method for packet forwarding by a stacking port control member of a star stacking system, wherein members of the star stacking system comprise at least one stacking control member and at least one stacking port extension member; the method comprising:

receiving a packet;

forwarding the packet according to a destination port number of the packet when a destination forwarding chip identifier (ID) of the packet is a local forwarding chip ID;

determining whether the packet is transmitted to a stacking port extension member when the destination forwarding chip ID of the packet is not the local forwarding chip ID;

detecting whether a forwarding relationship used for forwarding the packet is configured locally when a determination is made that the packet is transmitted to the stacking port extension member;

when a detection is made that the forwarding relationship is configured locally, forwarding the packet according to the forwarding relationship;

when a detection is made that the forwarding relationship is not configured locally, forwarding the packet to another stacking control member to cause the other stacking control member to forward the packet to the stacking port extension member; and collecting topology information between the stacking control member and the other stacking control member connected to the stacking control member without collecting topology information between the stacking control member and any stack port extension member;

the forwarding the packet to another stacking control member comprises:

selecting a stacking control member which has been already configured with the forwarding relationship using the topology information collected and according to a Shortest Path principle, and forwarding the packet to the selected stacking control member through a first-level stacking port; wherein the first-level stacking port is a stacking port connecting the other stacking control member.

6. The method of claim 5, wherein:

stacking control members are stacked with each other in the form of a ring stacking or a chain stacking to form a switching and forwarding center of the star stacking system; the switching and forwarding center formed by the stacking control members is served as a root node of a tree structure, and the at least one stacking port extension member is connected to the switching and forwarding center in the form of the tree structure;

a forwarding chip ID is assigned to each of the members in the star stacking system, and the forwarding chip ID assigned to each of the members is associated with a device ID of each of the members;

the determining whether the packet is transmitted to a stacking port extension member comprises:

identifying a device ID associated with the destination forwarding chip ID of the packet, determining that the packet is transmitted to the stacking port extension member when the device ID is a device ID of the stacking port extension member, and otherwise, determining that the packet is not transmitted to the stacking port extension member.

7. The method of claim 5, wherein the forwarding relationship is configured when a downlink second-level stacking port connecting the stacking port extension member is configured, and comprises a device ID of the stacking port extension member and the downlink second-level stacking port connecting the stacking port extension member;

the forwarding the packet according to the forwarding relationship comprises:

searching out the downlink second-level stacking port from the forwarding relationship, and forwarding the packet through the downlink second-level stacking port in the forwarding relationship.

8. The method of claim 7, wherein the downlink second-level stacking port connecting the stacking port extension member has at least one member port; wherein the member port is a local port on the stacking control member that connects the stacking port extension member, or is a port on the other stacking control member that connects the stacking port extension member.

9. An apparatus for packet forwarding, wherein the apparatus is to act as a stacking port extension member in a star stacking system; wherein the star stacking system comprises at least one stacking control member; the apparatus comprising:

an uplink second-level stacking port, to connect a higher-level stacking port extension member or a stacking control member;

a storage, to store a forwarding relationship towards a lower-level stacking port extension member;

a forwarding module, to receive a packet, forward the packet according to a destination port number of the packet when a destination forwarding chip identifier (ID) of the packet is a local forwarding chip ID, determine whether the packet is transmitted to a lower-level stacking port extension member when the destination forwarding chip ID of the packet is not the local forwarding chip ID, forward the packet according to the forwarding relationship towards the lower-level stacking port extension member which is stored in the storage when a determination is made that the packet is transmitted to the lower-level stacking port extension member, and otherwise, directly forward the packet through the uplink second-level stacking port; and a downlink second-level stacking port, to connect the lower-level stacking port extension member;

wherein the forwarding relationship towards the lower-level stacking port extension member is configured when the downlink second-level stacking port connecting the lower-level stacking port extension member is configured, and comprises a device ID of the lower-level stacking port extension member and the downlink second-level stacking port connecting the lower-level stacking port extension member;

when the forwarding module forwards the packet according to the forwarding relationship towards the lower-level stacking port extension member which is stored in the storage, the forwarding module is further to search out the downlink second-level stacking port from the forwarding relationship towards the lower-level stacking port extension member, and forward the packet through the downlink second-level stacking port.

10. The apparatus of claim 9, wherein:
a forwarding chip ID is assigned to each member in the star stacking system, and the forwarding chip ID assigned to each member is associated with a device ID of each member;
when the forwarding module determines whether the packet is transmitted to the lower-level stacking port extension member, the forwarding module is further to identify a device ID associated with the destination forwarding chip ID of the packet, determine that the packet is transmitted to the lower-level stacking port extension member when the device ID is a device ID of the lower-level stacking port extension member, and otherwise, determine that the packet is not transmitted to the lower-level stacking port extension member.

11. An apparatus for packet forwarding, wherein the apparatus is to act as a stacking control member in a star stacking system, the apparatus comprising:
a storage, to store forwarding relationships;
a forwarding module, to receive a packet, forward the packet according to a destination port number of the packet when a destination forwarding chip ID of the packet is a local forwarding chip ID, determine whether the packet is transmitted to a stacking port extension member when the destination forwarding chip ID of the packet is not the local forwarding chip ID, detect whether the storage has already stored a forwarding relationship used for forwarding the packet when a determination is made that the packet is transmitted to the stacking port extension member, forward the packet according to the forwarding relationship used for forwarding the packet when a detection is made that the storage has already stored the forwarding relationship, and forward the packet to another stacking control member when a detection is made that the storage has not stored the forwarding relationship to cause the other stacking control member to forward the packet to the stacking port extension member,
wherein:
a forwarding chip ID is assigned to each member in the star stacking system, and the forwarding chip ID assigned to each member is associated with a device ID of each member;
when the forwarding module determines whether the packet is transmitted to the stacking port extension member, the forwarding module is further to identify a device ID associated with the destination forwarding chip ID of the packet, determine that the packet is transmitted to the stacking port extension member when the device ID is a device ID of the stacking port extension member, and otherwise, determine that the packet is not transmitted to the stacking port extension member.

\* \* \* \* \*